United States Patent Office 3,177,192
Patented Apr. 6, 1965

3,177,192
PRODUCTION OF CIS-1,4 POLYBUTADIENE WITH A TiCl$_4$-TiI$_4$-PbR$_4$ CATALYST
Floyd E. Naylor, Bartlesville, Okla., assignor to Phillips Petroleum Company, a corporation of Delaware
No Drawing. Filed Apr. 7, 1961, Ser. No. 101,325
7 Claims. (Cl. 260—94.3)

This invention relates to a process for polymerizing 1,3-butadiene so as to obtain a rubbery polymer. In one aspect, the invention relates to a process for producing cis 1,4-polybutadiene and to a catalyst system therefor.

Numerous methods are described in the literature for polymerizing 1,3-butadiene, including emulsion polymerization, alkali metal catalyzed polymerization, and alfin-catalyzed polymerization. The polybutadiene products produced by these processes contain varying amounts of cis 1,4-addition, trans 1,4-addition and 1,2-addition. However, until quite recently it seems that no polymer of butadiene had been produced which contained more than about 50 percent cis 1,4-configuration. It has now been discovered, as disclosed in copending patent application Serial No. 578,166, filed on April 16, 1956, by R. P. Zelinski and D. R. Smith, that polybutadiene containing at least 85 percent cis 1,4-addition can be produced by polymerizing 1,3-butadiene with a catalyst comprising a trialkylaluminum and titanium tetraiodide. The present invention is concerned with the discovery of a novel catalyst system which also makes it possible to produce a polybutadiene having a high cis 1,4-content.

It is an object of this invention to provide a novel process for producing a rubbery polymer of 1,3-butadiene.

Another object of the invention is to provide a process for polymerizing 1-3-butadiene in which the rubbery polymer produced contains a high percentage, e.g., from 90 to 95 percent and higher, of cis 1,4-addition.

A further object of the invention is to provide a novel catalyst system for use in the preparation of a polybutadiene having a high cis 1,4-content.

Other and further objects and advantages of the invention will become apparent to those skilled in the art upon consideration of the accompanying disclosure.

Broadly speaking, the process of this invention comprises the step of contacting 1,3-butadiene with a catalyst formed by mixing components comprising (a) an organolead compound having the formula R$_4$Pb, wherein R is a hydrocarbon radical selected from the group consisting of alkyl, cycloalkyl, aryl, alkaryl, and aralkyl radicals, (b) titanium tetrachloride, and (c) titanium tetraiodide. The R in the aforementioned formula preferably contains from 1 to 20 carbon atoms. As mentioned above, it has previously been discovered that a cis-polybutadiene can be prepared by polymerizing 1,3-butadiene with a trialkylaluminum-titanium tetraiodide catalyst. However, it was found that a polybutadiene having a high cis-content was not produced when 1,3-butadiene was polymerized in the presence of a catalyst consisting of an organolead compound and titanium tetraiodide. Furthermore, when it was attempted to polymerize 1,3-butadiene with a catalyst consisting of an organolead compound and titanium tetrachloride, only a trace of insoluble polymer was obtained. It was completely unexpected, therefore, when it was discovered that addition of titanium tetrachloride to the organolead-titanium tetraiodide catalyst system resulted in the production of a cis-polybutadiene. The discovery of the present catalyst system takes on added importance from an economic standpoint since it is much cheaper to produce a cis-polybutadiene from the process of this invention than by a process which utilizes a catalyst containing only an organometal and titanium tetraiodide. Thus, it is possible to obtain such a product by the present process while employing a smaller amount of the titanium tetraiodide, which is by far the most expensive of the catalyst materials. In other words, the cost of the catalyst per pound of polymer is much less when proceeding in accordance with the present invention.

Examples of organolead compounds suitable for use in the present catalyst system include tetramethyllead, tetraethyllead, tetra-n-propyllead, tetra-tert-butyllead, tetra-n-hexyllead, tetradecyllead, tetra(tridecyl)lead, tetraeicosyllead, tetracyclohexyllead, tetra-4-methylcyclohexyllead, tetrabenzyllead, tetra(4-phenyl-n-butyl)lead, tetraphenyllead, tetra-1-naphthyllead, tetra-4-tolyllead, tetra(2,4-diethylphenyl)lead, tetra(3,5-di-n-heptylphenyl)lead, dimethyldiethyllead, dimethyldiphenyllead, methylethyldiphenyllead, tri-n-butylphenyllead, and the like.

The mol ratio of the organolead compound to total titanium halide, i.e., the mol ratio of lead to titanium, is usually in the range of 1:1 to 2:1. The mol ratio of titanium tetrachloride to titanium tetraiodide is generally in the range of 0.5:1 to 5:1. The concentration of total catalyst used in the present process can vary over a rather broad range. The catalyst level is usually in the range of 1 to 20 gram millimols of the organolead compound per 100 grams of 1,3-butadiene to be polymerized. The actual catalyst level used will, in general, be determined by the molecular weight of the product which is desired.

The polymerization process of this invention is usually carried out in the presence of a diluent. Diluents suitable for use in the process are hydrocarbons which are non-detrimental to the polymerization reaction. Suitable diluents include aromatics, such as benzene, toluene, xylene, ethylbenzene, and mixtures thereof. It is also within the scope of the invention to use straight and branched chain paraffins which contain up to and including 12 carbon atoms per molecule. Examples of paraffins which can be utilized include propane, normal butane, normal pentane, isopentane, normal hexane, isohexane, 2,2,4-triethylpentane (isooctane), normal decane, normal dodecane, and the like. Mixtures of these paraffinic hydrocarbons can also be employed as diluents in carrying out the process. Cycloparaffins, such as cyclohexane and methylcyclohexane, can also be utilized. Furthermore, mixtures of any of the aforementioned hydrocarbons can be used as diluents. It is usually preferred to carry out the polymerization in an aromatic hydrocarbon since polymers having the highest cis-contents are produced when operating in this manner.

The polymerization process of this invention can be carried out at temperatures varying over a rather wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent being employed and the temperature at which the polymerization is conducted. However, higher pressures can be used if desired, these pressures being obtained by some such suitable method as the pressurization of the reactor with a gas which is inert with respect to the polymerization reaction. It is to be understood also that it is within the scope of the invention to conduct the polymerization in the solid phase.

The process of this invention can be carried out as a batch process by charging 1,3-butadiene to a reactor containing catalyst and diluent. Although any suitable charging procedure can be used, it is usually preferred to add the catalyst components to a reactor containing diluent and thereafter introducing the 1,3-butadiene. The titanium tetraiodide and titanium tetrachloride can be added to the reactor separately, or they can be mixed with each other or with the organolead compound prior to introduction into the reactor. It is to be understood also that it is within the scope of the invention to preform the catalyst by reacting the catalyst components within a separate catalyst separation vessel. The resulting reaction product can be charged to the reactor containing monomer and diluent or these latter materials can be added after the catalyst. The process can also be carried out continuously by maintaining the above-mentioned concentration of reactants in the reactor for a suitable residence time. The residence time in a continuous process will, of course, vary within rather wide limits, depending upon such variables as temperature, pressure, the ratio of catalyst components and the catalyst concentration. In a continuous process, the residence time usually falls within the range of 1 second to 2 hours when conditions within the specified ranges are employed. When a batch process is being utilized, the time for the reaction can be as high as 24 hours or more.

Various materials are known to be detrimental to the catalyst composition of this invention. These materials include carbon dioxide, oxygen and water. It is usually desirable, therefore, that the butadiene be freed of these materials as well as other materials which may tend to inactivate the catalyst. Any of the known means for removing such contaminants can be used. Furthermore, when a diluent is used in the process, it is preferred that these materials be substantially free of impurities such as water, oxygen and the like. In this connection, it is desirable to remove air and moisture from the reaction vessel in which the polymerization is to be conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which can be tolerated is insufficient to cause deactivation of the catalyst.

Upon completion of the polymerization reaction, when a batch process is used, the total reaction mixture is then treated to inactivate the catalyst and recover the rubbery polymer. Any suitable method can be utilized in carrying out this treatment of the reaction mixture. In one method, the polymer is recovered by steam stripping the diluent from the polymer. In another suitable method, a catalyst-inactivating material such as an alcohol, is added to the mixture so as to inactivate the catalyst and cause precipitation of the polymer. The polymer is then separated from the alcohol and diluent by any suitable method, such as decantation or filtration. It is often preferred to add initially only an amount of the catalyst-inactivating material which is sufficient to inactivate the catalyst without causing precipitation of the dissolved polymer. It has also been found to be advantageous to add an antioxidant, such as phenyl-beta-naphthylamine, to the polymer solution prior to recovery of the polymer. After addition of the catalyst-inactivating material and the antioxidant, the polymer present in the solution can then be separated by the addition of an excess of a material such as ethyl alcohol or isopropyl alcohol. When the process is carried out continuously, the total effluent from the reactor can be pumped to a catalyst-inactivating zone wherein the reactor effluent is contacted with a suitable catalyst-inactivating material such as an alcohol. When an alcohol is used as the catalyst-inactivating material, it also functions to precipitate the polymer. In the event catalyst-inactivating materials are employed which do not perform this dual role, a suitable material, such as an alcohol, can be added to precipitate the polymer. It is, of course, to be realized that it is within the scope of the invention to employ other suitable means to recover the polymer from solution. After separation from the water or alcohol and diluent by filtration or other suitable means, the polymer is then dried.

The polymers produced in accordance with this invention are rubbery polymers. The polymers can be compounded by the various methods such as have been used in the past for compounding natural and synthetic rubbers. Vulcanization accelerators, vulcanizing agents, reinforcing agents and fillers such as have been employed in natural rubber can likewise be used in compounding the rubber of this invention. It is also within the scope of the invention to blend the polymers with other polymeric materials such as natural rubber, cis 1,4-polyisoprene, polyethylene, and the like. As mentioned above, the polymers of this invention have a high cis-content, and this property renders them very suitable for applications requiring low hysteresis, high resiliency, and low freeze point. In general, the polymers have utility in applications where natural and synthetic rubbers are used. They are particularly useful in the manufacture of automobile and truck tires and other rubbery articles, such as gaskets.

A more comprehensive understanding of the invention can be obtained by referring to the following illustrative examples which are not intended, however, to be unduly limitative of the invention.

Samples of certain of the polymer products produced in the runs described in the examples were examined by infrared analysis. This work was carried out in order to determine the percentage of the polymer formed by cis 1,4-addition, trans 1,4-addition and 1,2-addition of the butadiene. The procedure described hereinafter was employed in making these determinations.

The polymer samples were dissolved in carbon disulfide so as to form a solution having 25 grams of polymer per liter of solution. The infrared spectrum of each of the solutions (percent transmission) were then determined in a commercial infrared spectrometer.

The percent of the total unsaturation present as trans 1,4- was calculated according to the following equation and consistent units:

$$\epsilon = \frac{E}{tc}$$

where $\epsilon$ equals extinction coefficient (liters-mols$^{-1}$-centimeters$^{-1}$); E equals extinction (log $I_o/I$); $t$ equals path length (centimeters); and $c$ equals concentration (mol double bond/liters). The extinction was determined at the 10.35 micron band and the extinction coefficient was 146 (liters-mols$^{-1}$-centimeters$^{-1}$).

The percent of the total unsaturation present as 1,2- (or vinyl) was calculated according to the above equation, using the 11.0 micron band and an extinction coefficient of 209 (liters-mols$^{-1}$-centimeters$^{-1}$).

The percent of the total unsaturation present as cis 1,4- was obtained by subtracting the trans 1,4- and 1,2- (vinyl) determined according to the above procedures from the theoretical unsaturation, assuming one double bond per each $C_4$ unit in the polymer.

EXAMPLE I

Butadiene was polymerized in a series of runs in the presence of a catalyst formed by mixing tetraethyllead, titanium tetrachloride and titanium tetraiodide. The following recipe was used in the runs:

*Recipe*

| | |
|---|---|
| 1,3-butadiene, parts by weight | 100 |
| Toluene, parts by weight | 1200 |
| Tetraethyllead, millimoles | 10 |
| Titanium tetraiodide, millimoles | Variable |
| Titanium tetrachloride, millimoles | Variable |
| Temperature, °F. | 41 |
| Time, hours | 18 |

Toluene was charged first after which the reactor was purged with nitrogen. Tetraethyllead was then added as a solution in toluene, and then there was charged a mixture of titanium tetrachloride and titanium tetraiodide dispersed in toluene. Butadiene was introduced last into the reactor. The charging was done at room temperature and the mixture was cooled immediately after the butadiene was introduced. The results of the runs are summarized in the following table:

TABLE

| Run No. | TiI₄, mmoles | TiCl₄, mmoles | Pb/Total Ti, Mole Ratio | Conversion, Percent | Inh. Visc. | Microstructure, Percent | | |
|---|---|---|---|---|---|---|---|---|
| | | | | | | Cis | Trans | Vinyl |
| 1 | 5.0 | 5.0 | 1/1 | 46 | | | | |
| 2 | 3.3 | 3.3 | 1.5/1 | 70 | 0.91 | 93.7 | 3.7 | 2.6 |
| 3 | 2.5 | 2.5 | 2/1 | trace | | | | |

A run was conducted under similar conditions with a catalyst formed from components consisting of tetraethyllead and titanium tetraiodide. The polybutadiene product obtained in this run contained 59.1 percent cis 1,4-addition, 38.6 percent trans 1,4-addition and 2.3 percent 1,2-addition.

The foregoing data demonstrate that the present catalyst is effective in producing a polybutadiene containing a high percentage of cis 1,4-addition. However, when a catalyst formed from components consisting of an organolead compound and titanium tetraiodide was used, the polybutadiene contained only a relatively small amount of cis 1,4-addition. It was completely unexpected when it was discovered that addition of titanium tetrachloride to the latter system would direct the polymerization of butadiene to a cis-polymer.

As will be evident to those skilled in the art, many variations and modifications of this invention can be practiced in view of the foregoing disclosure. Such variations and modifications are believed to come within the spirit and scope of the invention.

I claim:

1. A process for preparing a cis 1,4-polybutadiene which comprises contacting 1,3-butadiene in a hydrocarbon diluent with a catalyst obtained by mixing materials comprising (a) an organolead compound having the formula $R_4Pb$, wherein R is selected from the group consisting of alkyl, cycloalkyl, aryl, alkaryl and aralkyl radicals, and (b) titanium tetrachloride and titanium tetraiodide, the mol ratio of said organolead compound to total titanium compounds being in the range of 1:1 to 2:1 and the mol ratio of titanium tetrachloride to titanium tetraiodide being in the range of 0.5:1 to 5:1, said contacting occurring at a temperature in the range of −100 to 250° F. and at a pressure sufficient to maintain the reaction mixture in the liquid phase; and recovering a polybutadiene containing at least 90 percent cis 1,4-addition.

2. A process according to claim 1 in which said catalyst is that which forms on mixing tetraethyllead, titanium tetrachloride and titanium tetraiodide.

3. A process according to claim 1 in which said catalyst is that which forms on mixing tetraphenyllead, titanium tetrachloride and titanium tetraiodide.

4. A process according to claim 1 in which said catalyst is that which forms on mixing tetra-n-propyllead, titanium tetrachloride and titanium tetraiodide.

5. A process according to claim 1 in which said catalyst is that which forms on mixing tetrabenzyllead, titanium tetrachloride and titanium tetraiodide.

6. A process according to claim 1 in which said catalyst is that which forms on mixing dimethyldiphenyllead, titanium tetrachloride and titanium tetraiodide.

7. A process for preparing a cis 1,4-polybutadiene which comprises contacting 1,3-butadiene in a hydrocarbon diluent with a catalyst formed by mixing tetraethyllead, titanium tetrachloride and titanium tetraiodide, the mol ratio of said tetraethyllead to total titanium compounds being in the range of 1:1 to 2:1 and the mol ratio of titanium tetrachloride to titanium tetraiodide being in the range of 0.5:1 to 5:1, said contacting occurring at a temperature in the range of −30 to 160° F. and under autogenous pressure; and recovering a polybutadiene containing at least 90 percent cis 1,4-addition.

References Cited by the Examiner

UNITED STATES PATENTS

| 2,832,759 | 4/58 | Nowlin et al. | 260—94.2 |
| 2,938,019 | 5/60 | Stuart | 260—93.7 |
| 3,036,056 | 5/62 | Rion | 260—94.3 |
| 3,099,648 | 7/63 | Dye | 260—94.3 |

FOREIGN PATENTS

| 581,294 | 2/60 | Belgium. |
| 1,104,188 | 4/61 | Germany. |

JOSEPH L. SCHOFER, *Primary Examiner.*

M. LIEBMAN, WILLIAM H. SHORT, *Examiners.*